(12) United States Patent
Fukuzawa et al.

(10) Patent No.: US 7,471,492 B2
(45) Date of Patent: Dec. 30, 2008

(54) MAGNETORESISTIVE ELEMENT, MAGNETIC HEAD AND MAGNETIC RECORDING/REPRODUCING APPARATUS

(75) Inventors: Hideaki Fukuzawa, Sagamihara (JP); Hiromi Yuasa, Yokohama (JP); Susumu Hashimoto, Ebina (JP); Hitoshi Iwasaki, Yokosuka (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 450 days.

(21) Appl. No.: 10/895,844

(22) Filed: Jul. 22, 2004

(65) Prior Publication Data
US 2005/0057862 A1 Mar. 17, 2005

(30) Foreign Application Priority Data
Jul. 24, 2003 (JP) ............................. 2003-201131

(51) Int. Cl.
*G11B 5/127* (2006.01)
(52) U.S. Cl. ................ 360/322; 360/314; 360/324; 360/324.1; 360/324.11; 360/324.12; 365/158; 365/171; 257/421; 257/422
(58) Field of Classification Search ............... 360/314, 360/324, 324.1, 324.11, 324.12, 322; 365/158, 365/171; 257/421, 422
See application file for complete search history.

(56) References Cited

U.S. PATENT DOCUMENTS

| | | | | |
|---|---|---|---|---|
| 5,206,590 A | | 4/1993 | Dieny et al. | |
| 5,576,915 A | * | 11/1996 | Akiyama et al. | 360/314 |
| 6,104,275 A | * | 8/2000 | Maeda | 338/32 R |
| 2001/0022373 A1 | * | 9/2001 | Minakata et al. | 257/295 |
| 2001/0053052 A1 | * | 12/2001 | Ihara et al. | 360/324.1 |
| 2002/0075611 A1 | * | 6/2002 | Seigler et al. | 360/324 |

FOREIGN PATENT DOCUMENTS

| | | | |
|---|---|---|---|
| EP | 238110 A | * | 9/1987 |
| JP | 2001-358379 A | | 12/2001 |
| JP | 2003-8105 A | | 1/2003 |

OTHER PUBLICATIONS

J.C. Slonczewski, "Currentdriven excitation of magnetic multilayers", Journal of Magnetism and Magnetic Materials, vol. 159, 1996, pp. L1-L7.

(Continued)

*Primary Examiner*—Andrea L Wellington
*Assistant Examiner*—Carlos E Garcia
(74) *Attorney, Agent, or Firm*—Oblon, Spivak, McClelland, Maier & Neustadt, P.C.

(57) ABSTRACT

A magnetoresistive element has a first magnetic layer and a second magnetic layer separate from each other, the first magnetic layer and the second magnetic layer each having a magnetization whose direction is substantially pinned, and a non-magnetic conductive layer formed in contact with the first magnetic layer and the second magnetic layer and electrically connecting the first and second magnetic layers, the non-magnetic conductive layer forming a path of spin-polarized electrons from one of the magnetic layer to the other magnetic layer, the non-magnetic conductive layer comprising a portion located between the first magnetic layer and the second magnetic layer, the portion being a sensing area.

11 Claims, 10 Drawing Sheets

OTHER PUBLICATIONS

Juan A. Caballero, et al., "Magnetoresistance of a Planar Spin Valve with Single-Domain Ferromagnetic Probes", IEEE Transactions on Magnetics, vol. 37, No. 4, XP-002372826, Jul. 2001, pp. 2111-2113.
Takashi Kimura, et al., "Fabrication of Planar-Type Ferromagnet/Nonmagnet/Ferromagnet Structures Using Multiangle Deposition", Japanese Journal of Applied Physics, vol. 41, No. 6B, Part 1, XP-001163433, Jun. 2002, pp. 4385-4389.

Y. Q. Jia, et al., "Spin-Valve Effects in Nickel/Silicon/Nickel Junctions", IEEE Transactions on Magnetics, vol. 32, No. 5 XP-000634112, Sep. 1996, pp. 4707-4709.
Kohishiro Inomata, Atsushi Kurobe, "Challenge to New Principle Attained by Nano," Toshiba Review, Japan, Kabushiki Kaisha Toshiba, Engineering and Drafting Department, Feb. 1, 1999, vol. 54, No. 2, pp. 2-8.

* cited by examiner

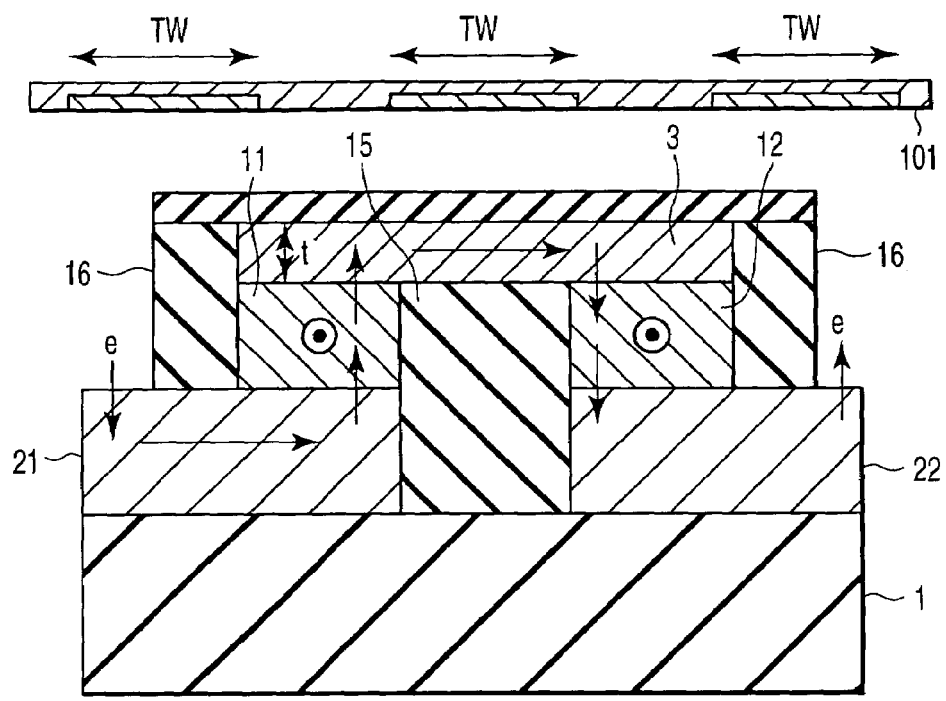
F I G. 16
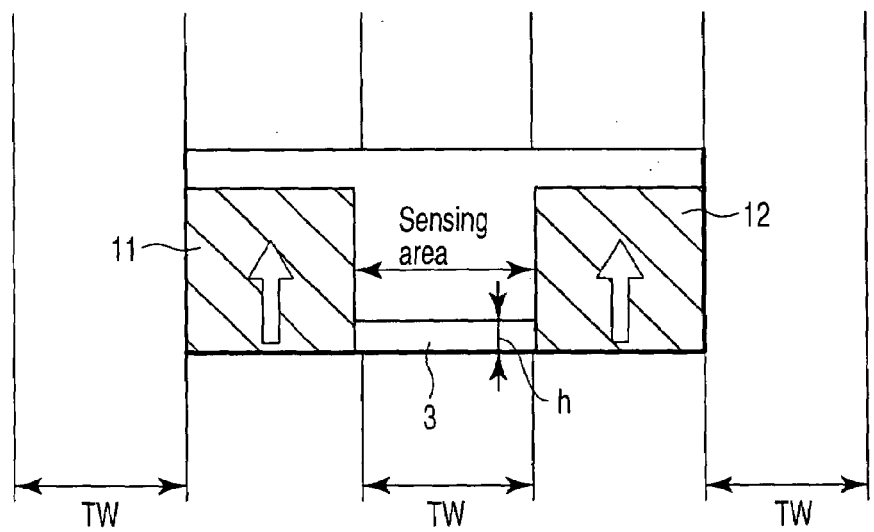
F I G. 17

MAGNETORESISTIVE ELEMENT, MAGNETIC HEAD AND MAGNETIC RECORDING/REPRODUCING APPARATUS

CROSS-REFERENCE TO RELATED APPLICATIONS

This application is based upon and claims the benefit of priority from prior Japanese Patent Application No. 2003-201131, filed Jul. 24, 2003, the entire contents of which are incorporated herein by reference.

BACKGROUND OF THE INVENTION

1. Field of the Invention

The present invention relates to a magnetoresistive element, magnetic head and magnetic recording/reproducing apparatus.

2. Description of the Related Art

By virtue of the discovery of a magnetoresistive element that exhibits a giant magnetoresistive effect (GMR), the performance of magnetic devices, in particular, magnetic heads, has been significantly enhanced. In particular, since a spin-valve (SV) film has a structure that can be easily applied to magnetic devices, it has enormously contributed to technical development of magnetic discs.

A spin-valve film comprises two ferromagnetic layers and a non-magnetic layer interposed therebetween. One of the ferromagnetic layers, called a pinned layer, has a magnetization whose direction is pinned by, for example, an antiferromagnetic layer, while the other ferromagnetic layer, called a free layer, has a magnetization whose direction is made to respond to an external magnetic field. In this structure, a giant magnetoresistance change can be obtained in accordance with a change in the relative angle made by magnetization directions of the pinned and free layers. Theoretically, the spin-valve film enables efficient magnetic field detection if the magnetization direction of the free layer is made parallel to the track width direction when the external magnetic field is zero, and if the magnetoresistance change is generated when the magnetization direction of the free layer is changed in accordance with the external magnetic field (see U.S. Pat. No. 5,206,590).

Conventional spin-valve films are mainly of a current-in-plane (CIP) type in which a sense current is made to flow parallel to the film plane. On the other hand, spin-valve films of a current-perpendicular-to-plane (CPP) type are now being developed, in which a sense current is made to flow substantially perpendicular to the film plane, because they exhibit a much greater GMR effect than the CIP type. At the present stage, CPP spin-valve films are expected as a most-promising technique for realizing a magnetic recording/reproducing apparatus having an areal recording density of 200 Gbit/inch$^2$ (Gbpsi) or more.

To achieve a high recording density, the size of the spin-valve film must inevitably be reduced. In other words, it is necessary to narrow the track width recorded on a medium for high recording density. Accordingly, it is also necessary to reduce the size of the free layer, as a sensing layer, of a spin-valve film. For instance, the track width of a spin-valve film is as narrow as about 100 nm if the areal recording density is 200 Gbit/inch$^2$, about 50 nm for an areal recording density of 500 Gbit/inch$^2$, and about 35 nm for an areal recording density of 1 Tbit/inch$^2$. If the conventional CPP spin-valve film size is reduced in accordance with an areal recording density of 500 Gbit/inch$^2$ or more, the following two serious problems may occur.

Firstly, a vortex domain may occur in the free layer. Assuming that the same sense current as in the conventional case is made to flow in the perpendicular direction, the smaller the free layer size, the higher the current density in the free layer. This causes a vortex domain in the free layer due to a current magnetic field. When a vortex domain occurs in the free layer, the magnetization direction of the free layer cannot be made parallel to the track width direction, resulting in unsatisfactory magnetic field detection. Such a vortex domain occurs when the current density is about 10$^8$ A/cm$^2$ or more. If, for example, the recording density is 500 Gbit/inch$^2$ and the sense current is 3 mA, the current density is 1.2×10$^8$ A/cm$^2$ and accordingly a vortex domain occurs. In this case, it is not an effective countermeasure to reduce the sense current to about 1 mA so as to avoid the occurrence of the vortex domain. This is because the countermeasure involves reduction in the signal output voltage (i.e., current×resistance change).

Secondly, the influence of a spin transfer torque phenomenon may be serious (see, for example, Journal of Magnetism and Magnetic Materials 159 (1996), L1-L7). Assume that the size (one side) of an element having two magnetic layers and a non-magnetic layer interposed therebetween is set to 100 nm or less, and a current with a current density of 10$^7$ to 10$^8$ A/cm$^2$ is made to flow through the element in the perpendicular direction. In this case, a phenomenon is observed in which a spin torque of one magnetic layer is transferred to the other magnetic layer, thereby changing the magnetization direction of the other magnetic layer. The occurrence of such a spin transfer torque phenomenon in the CPP spin-valve film means that, even if the external magnetic field from a medium is zero, the sense current changes the magnetization direction of the free layer. In other words, the phenomenon makes it difficult to realize the operating principle of the spin valve that the magnetization direction of the free layer is changed by the medium magnetic field to thereby detect a magnetoresistance change. In a CPP spin-valve film corresponding to a recording density of 500 Gbit/inch$^2$ or more, the element size and current density are significantly influenced by the spin transfer torque phenomenon. Therefore, the operation of the CPP spin-valve film is inhibited by the phenomenon.

As stated above, in a CPP spin-valve structure of a small element size, two problems, i.e., the vortex domain problem and spin transfer torque problem, may well occur, which makes it difficult to realize a magnetic recording/reproducing apparatus having a recording density of 500 Gbit/inch$^2$ or more.

BRIEF SUMMARY OF THE INVENTION

It is an object of the invention to provide a novel magnetoresistive element for high-density recording of 500 Gbit/inch$^2$ or more, a magnetic head using the magnetoresistive element, and a magnetic recording/reproducing apparatus equipped with the magnetic head.

According to an aspect of the invention, there is provided a magnetoresistive element comprising: a first magnetic layer and a second magnetic layer separate from each other, the first magnetic layer and the second magnetic layer each having a magnetization whose direction is substantially pinned; and a non-magnetic conductive layer formed in contact with the first magnetic layer and the second magnetic layer and electrically connecting the first and second magnetic layers, the non-magnetic conductive layer forming a path of spin-polarized electrons from one of the magnetic layer to the other magnetic layer, the non-magnetic conductive layer comprising a portion located between the first magnetic layer and the second magnetic layer, the portion being a sensing area.

In the above magnetoresistive element, the sensing area of the non-magnetic conductive layer located between the first magnetic layer and the second magnetic layer has a length of 100 nm or less.

According to another aspect of the invention, there is provided a magnetic head comprising the above magnetoresistive element.

According to yet another aspect of the invention, there is provided a magnetic recording/reproducing apparatus comprising a magnetic recording medium and the above magnetic head.

BRIEF DESCRIPTION OF THE SEVERAL VIEWS OF THE DRAWING

FIG. 16 is a sectional view illustrating a magnetoresistive element according to a further embodiment and a magnetic disc sectioned along a plane vertical to a surface of the magnetic disc;

FIG. 17 is a view for explaining the positional relationship between the magnetoresistive element of FIG. 16 and a track on the magnetic disc, the magnetoresistive element is shown by its sectional view parallel to a surface of the magnetic disc;

DETAILED DESCRIPTION OF THE INVENTION

Figure 1:
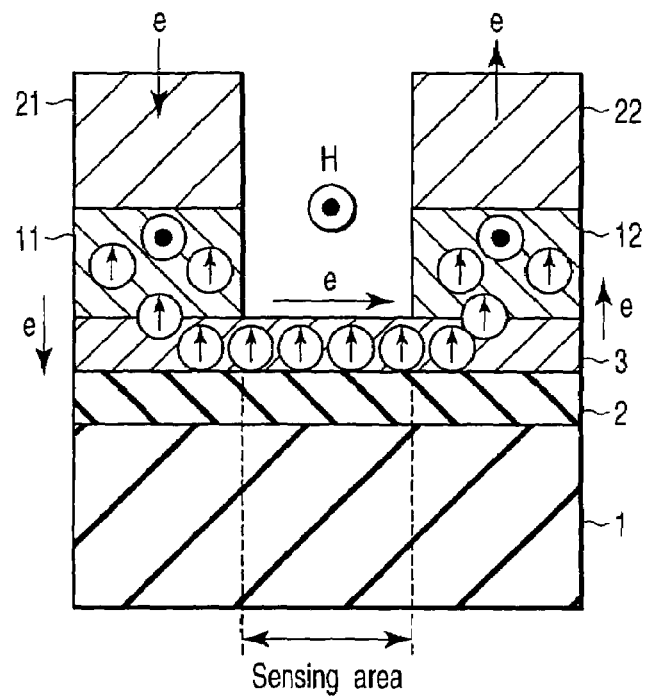
FIG. 1 is a sectional view of a magnetoresistive element according to an embodiment of the invention, taken along a plane parallel to the air-bearing surface of the magnetoresistive element.

In consideration of the fact that the problems of conventional spin-valve films are raised due to their soft-magnetic free layer, the inventors have studied a magnetoresistive element that can realize a desired function without a free layer. As long as employing magnetic layers whose magnetization directions are not substantially changed, the problems due to a vortex domain and spin transfer torque can be avoided. The inventors have paid attention to the fact that the dimensions of a magnetoresistive element corresponding to a high recording density of 500 Gbit/inch$^2$ or more are in physical areas at which a quantum effect can occur. Further, they have studied that a non-magnetic conductive layer in which conduction electrons for sensing an external magnetic field can be used as a sensing area. It is expected that conduction electrons flowing through the non-magnetic conductive layer can sense changes in an external magnetic field with much higher sensitivity than conduction electrons flowing through a magnetic layer. This is because the spin information obtained from conduction electrons flowing in the magnetic layer is influenced by the magnetization direction of the magnetic layer itself to a much higher degree than the influence of an external magnetic field upon the conduction electrons. In other words, a change in external magnetic field can hardly be detected from the conduction electrons in the magnetic layer.

The element that uses a non-magnetic conductive layer as a sensing area must satisfy following structural requirements:

Firstly, conduction electrons must have up- or down-spin information since if they have no spin information, they cannot sense a change in external magnetic field.

Secondly, a non-magnetic conductive layer used as a sensing area must be in contact with a magnetic layer. This is for the following reason: In general, conduction electrons flowing through a non-magnetic layer have their spin information averaged, not biased to up- or down-spin information. Therefore, it is needed to inject, into the non-magnetic conductive layer, conduction electrons with up- or down-spin information. To this end, it is necessary to make the non-magnetic conductive layer contact a magnetic layer that contains conduction electrons having a larger number of up-spins than down-spins (or vice versa) (i.e., conduction electrons having spin information).

Thirdly, the non-magnetic conductive layer must contact a magnetic layer (second magnetic layer) other than the above-mentioned magnetic layer (first magnetic layer). This is because even if the spin information of conduction electrons in the non-magnetic layer (sensing area) is changed by an external magnetic field, the resistance change does not easily occur, therefore it is needed to re-inject conduction electrons having certain spin information into the magnetic layer having spin information. When the conduction electrons with spin information are re-injected from the non-magnetic conductive layer to the second magnetic layer, the resistance changes depending upon whether the spin information is up or down, thereby generating a magnetoresistance effect.

In short, a magnetoresistive element according to the embodiments of the present invention comprises a first magnetic layer and a second magnetic layer separate from each other, the first magnetic layer and the second magnetic layer each having a magnetization whose direction is substantially pinned, and a non-magnetic conductive layer formed in contact with the first magnetic layer and the second magnetic layer and electrically connecting the first and second magnetic layers, the non-magnetic conductive layer forming a path of spin-polarized electrons from one of the magnetic layer to the other magnetic layer, the non-magnetic conductive layer comprising a portion located between the first magnetic layer and the second magnetic layer, the portion being a sensing area.

Figure 2:
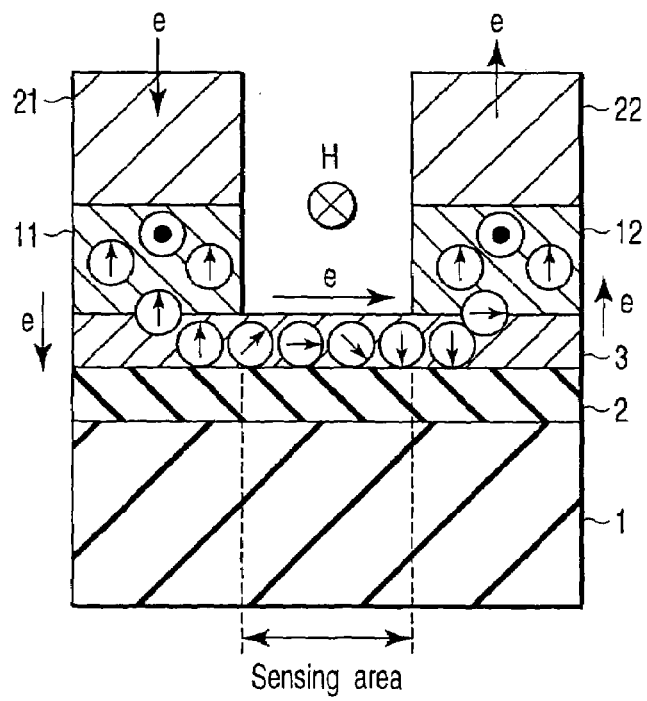
FIG. 2 is a sectional view of a magnetoresistive element according to an embodiment of the invention, taken along a plane parallel to the air-bearing surface of the magnetoresistive element.
Figure 3:
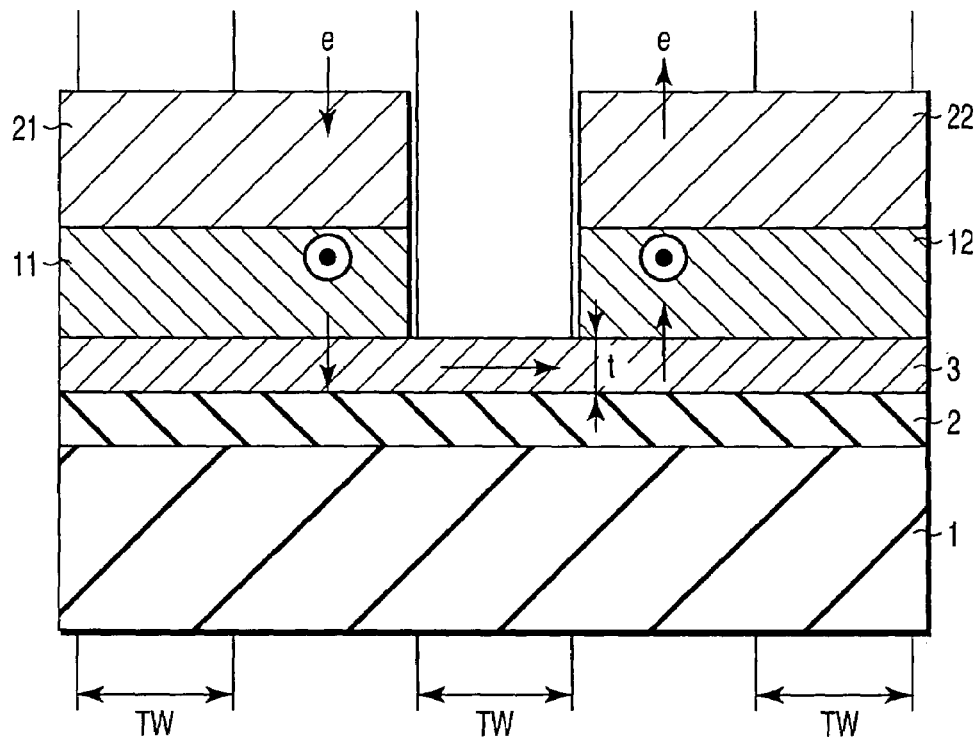
FIG. 3 is a view for explaining the positional relationship between the magnetoresistive element according to an embodiment of the invention and a track on the magnetic disc, the magnetoresistive element is shown by a sectional view.
Figure 4:
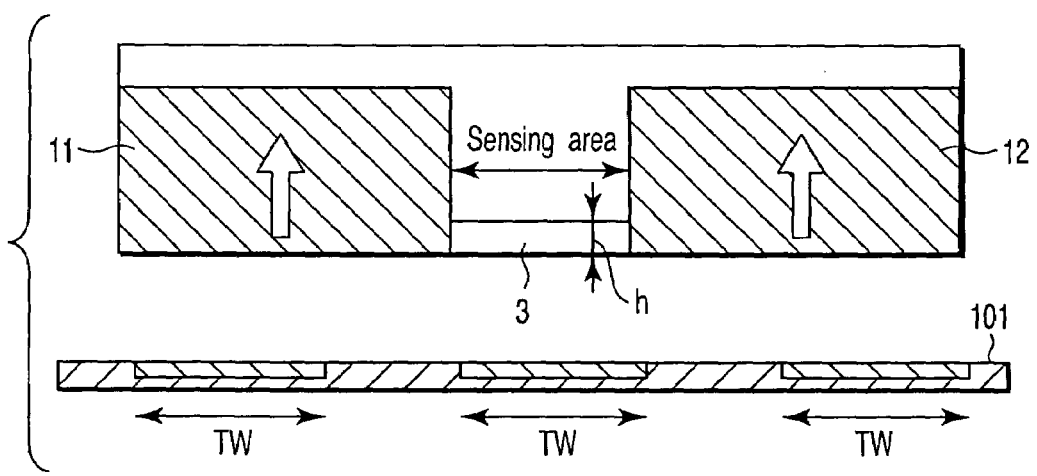
FIG. 4 is a sectional view illustrating the magnetoresistive element according to an embodiment of the invention and a magnetic disc sectioned along a plane vertical to a surface of the magnetic disc.

Referring to FIGS. 1 to 4, a description will be given of a magnetoresistive element, according to an embodiment of the invention, used for a read head reading data recorded on a magnetic recording medium. FIGS. 1 and 2 are sectional views of the magnetoresistive element, taken along a plane parallel to the air-bearing surface (ABS) of the magnetoresistive element. FIG. 3 is a view for explaining the positional relationship between the magnetoresistive element shown in FIGS. 1 and 2 and a track on the magnetic recording medium (magnetic disc). FIG. 4 is a sectional view illustrating the magnetoresistive element of the embodiment and a magnetic disc sectioned along a vertical plane.

As seen from FIGS. 1 and 2, an underlayer 2 of $Al_2O_3$ is formed on a substrate 1, and a non-magnetic conductive layer 3 of Cu having a thickness of 0.5 to 5 nm is formed on the underlayer 2. First and second magnetic layers 11 and 12 made of, for example, $Co_{90}Fe_{10}$ are formed on the non-magnetic layer 3 such that the layers 11 and 12 are separate from each other but both are in contact with the layer 3. The magnetization direction of the first and second magnetic layers 11 and 12 is substantially pinned. In this embodiment, the magnetization direction of the layers 11 and 12 is pinned upward from the ABS. The non-magnetic conductive layer 3 serves as a path for permitting spin-polarized electrons to flow from the first magnetic layer 11 to the second magnetic layer 12. Electrodes 21 and 22 are provided on the first and second magnetic layers 11 and 12, respectively.

The underlayer 2 may be formed of a material other than $Al_2O_3$. For example, another oxide, such as $SiO_2$, may be used as an insulation material. Further, a buffer layer or orientation seed layer may be provided between the underlayer 2 and non-magnetic conductive layer 3. For example, the seed layer may be formed of an alloy, oxide or nitride containing Ta, Ti, Cr, V, Zr, Nb, Mo or W. The seed layer may also be formed of a metal having a fcc or hcp structure.

As shown in FIGS. 3 and 4, the portion of the non-magnetic conductive layer 3 located between the first and second magnetic layers 11 and 12 is defined as a sensing area sensing an external magnetic field, and is positioned above a track (having a width TW) on a magnetic disc 101. The length of the sensing area is determined in accordance with the track width. Specifically, the length of the sensing area is set to 100 nm or less, and preferably to 10 to 100 nm. In FIGS. 3 and 4, t represents the thickness of the non-magnetic conductive layer 3, and h represents the width of the layer 3 that is perpendicular to the length of the sensing area. The width h of the non-magnetic conductive layer 3 is set to about 10 to 300 nm, preferably to 100 nm or less. It should be noted that dimensions of regions other than the sensing area are not particularly restricted as shown in FIGS. 3 and 4.

Referring to FIGS. 1 and 2, the operation of the magnetoresistive element of the embodiment will be described. FIG. 1 shows a case where external magnetic field information is "0" (upward), while FIG. 2 shows a case where it is "1" (downward).

A sense current is made to flow from the electrode 21 to the non-magnetic conductive layer 3 via the first magnetic layer 11. As a result, spin-polarized conduction electrons are injected from the first magnetic layer 11 into the non-magnetic conductive layer 3. Conduction electrons sense an external magnetic field while passing through the sensing area of the non-magnetic conductive layer 3.

In the case of FIG. 1, the external magnetic field information is "0", which indicates that the magnetization direction of the external magnetic field is the same as that of the first magnetic layer 11. Therefore, conduction electrons are not subjected to a change in spin information while passing through the sensing area of the non-magnetic conductive layer 3. Further, since the magnetization direction of the second magnetic layer is identical to that of the first magnetic layer 11, conduction electrons are injected from the non-magnetic conductive layer 3 into the second magnetic layer 12 with the spin information of the conduction electrons unchanged. In other words, there is no change in the spin information, and therefore the resistance of the magnetoresistive element is low. Thus, the external magnetic field information "0" is detected as a state in a low resistance.

In the case of FIG. 2, the external magnetic field information is "1", which indicates that the magnetization direction of the external magnetic field is opposite to that of the first magnetic layer 11. Therefore, the spin direction of conduction electrons is changed by the external magnetic field while the electrons are passing through the sensing area of the non-magnetic conductive layer 3. In an extreme case, the spin direction is completely reversed by the external magnetic field. That is, the spin direction of the conduction electrons injected from the non-magnetic conductive layer 3 is completely opposite to that of the conduction electrons contained in the second magnetic layer 12. In this state, when conduction electrons are injected from the non-magnetic conductive layer 3 into the second magnetic layer 12, their spin direction must be reversed at the interface of the layers 3 and 12, which increases the resistance. Thus, the external magnetic field information "1" is detected as a state in a high resistance.

Figure 13:
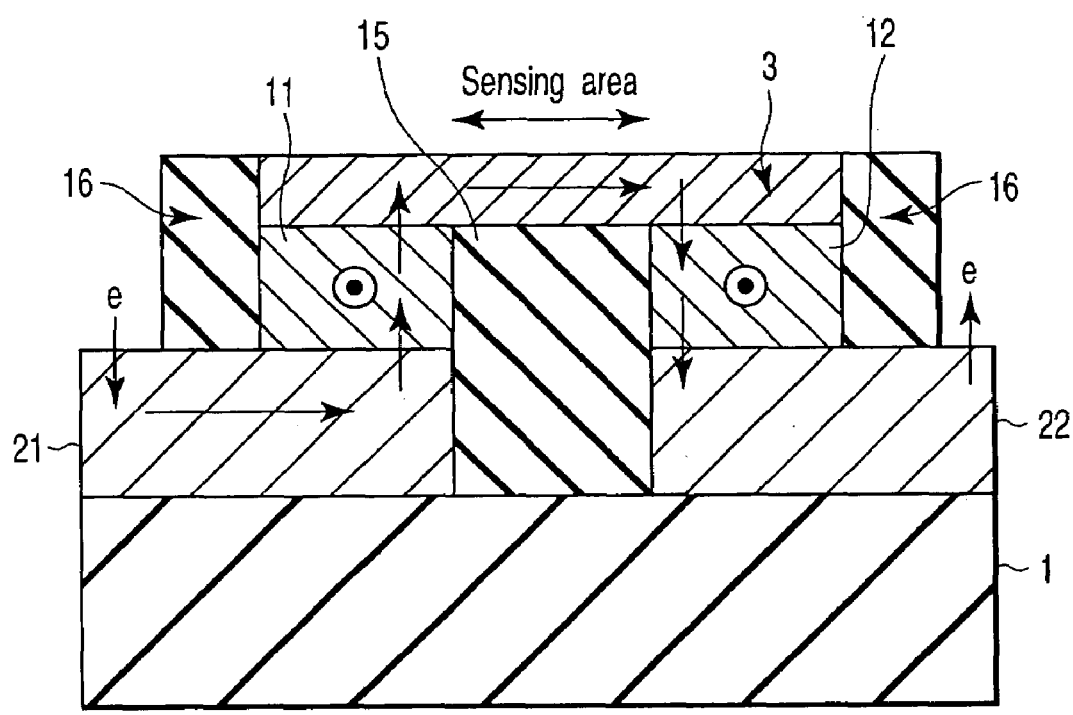
FIG. 13 is a sectional view of a magnetoresistive element according to another embodiment of the invention, taken along a plane parallel to the air-bearing surface of the magnetoresistive element.
Figure 14:
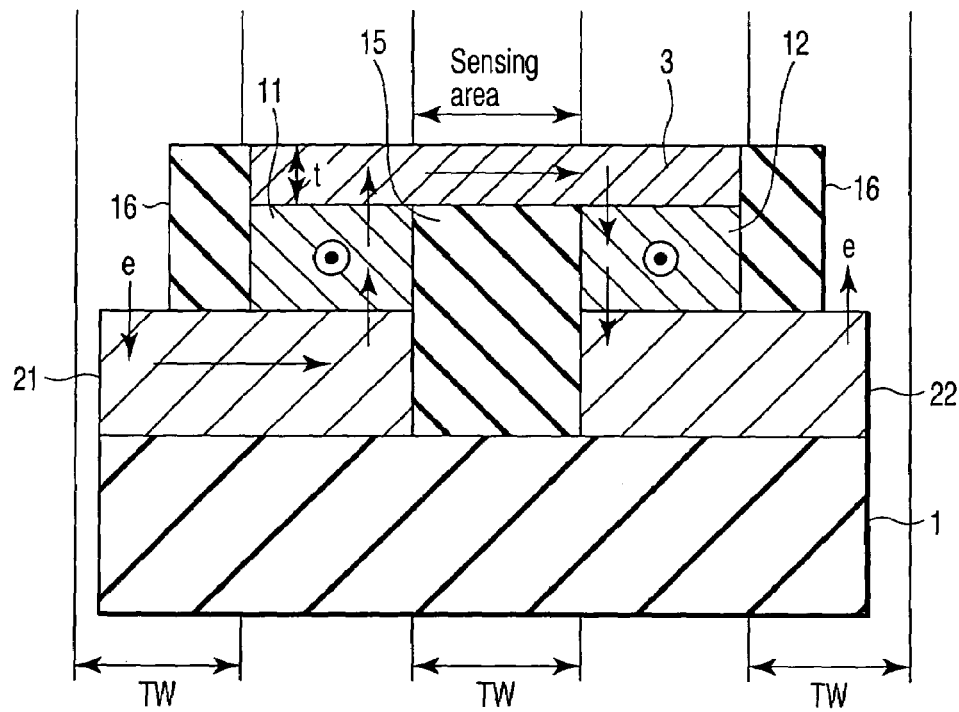
FIG. 14 is a view for explaining the positional relationship between the magnetoresistive element of FIG. 13 and a track on the magnetic disc.
Figure 15:
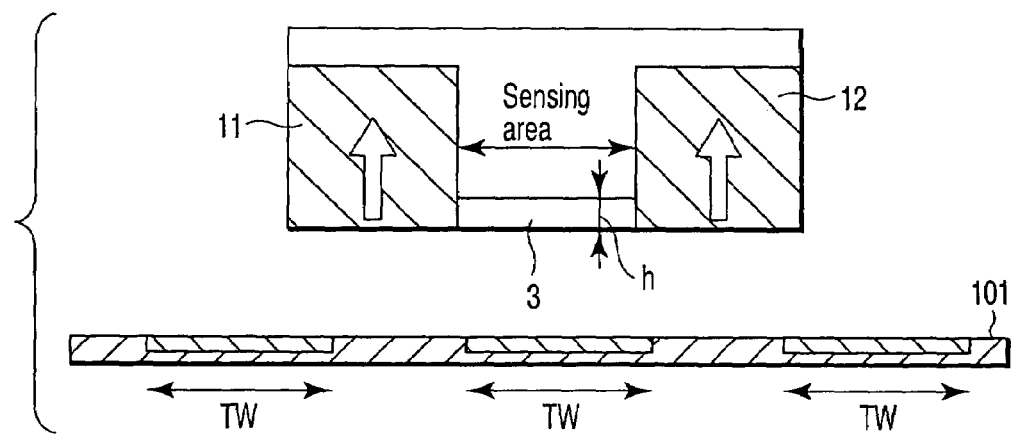
FIG. 15 is a sectional view illustrating the magnetoresistive element of FIG. 13 and a magnetic disc sectioned along a plane vertical to a surface of the magnetic disc.

In FIGS. 13 to 15, electrodes 21 and 22 are provided on the substrate 1 and separate from each other. An insulating layer 15 is arranged between the electrodes 21 and 22. First and second magnetic layers 11 and 12 are provided, separate from each other, on the electrodes 21 and 22, respectively. The insulating layer 15 is also arranged between the first and second magnetic layers 11 and 12. Insulating layers 16 are arranged on the side wall of the first magnetic layer 11 and that of the second magnetic layer 12, respectively. The magnetization direction of the first and second magnetic layers 11 and 12 is substantially pinned. A non-magnetic conductive layer 3 is provided on the first and second magnetic layers. The non-magnetic conductive layer 3 is a path for permitting spin-polarized electrons to flow from the first magnetic layer 11 to the second magnetic layer 12. The portion of the non-magnetic conductive layer 3 located between the first and second magnetic layers 11 and 12 is defined as a sensing area sensing an external magnetic field, and is positioned above a track (having a width TW) on the magnetic disc 101.

As described above with reference to FIGS. 1 and 2, although the magnetization direction of the first and second magnetic layers 11 and 12 is not changed substantially by the external magnetic field, the resistance of the magnetoresistive element is changed between a low-resistance state and high-resistance state, depending upon the external magnetic field. This is the feature, concerning the operation principle, of the magnetoresistive element of the embodiment, which essentially differs from the conventional spin-valve film. More specifically, the magnetoresistive element of the embodiment has, as magnetic layers, only the first and second magnetic layers 11 and 12 whose magnetization direction is firmly pinned so that it is not changed substantially by an external magnetic field, and does not have a sensing magnetic layer (free layer) whose magnetization direction is changed by the external magnetic field. Accordingly, the magnetoresistive element of the invention is advantageously free from the aforementioned problems of the prior art, i.e., the occurrence of a vortex domain in the free layer and the influence of the spin transfer torque phenomenon.

As described above, the magnetoresistive element according to the embodiments of the present invention can detect a magnetoresistance effect using the simple structure shown in FIGS. 1 to 4. This element cannot easily be inferred from the conventional spin-valve film.

A description will now be given of the dimensions of the magnetoresistive element according to the embodiments of the present invention. To provide the advantage of the magnetoresistive element of the embodiment, the thickness t of the non-magnetic conductive layer 3 shown in FIG. 3 and the width h of the layer 3 shown in FIG. 4 are regarded as important dimensions.

Figure 5:
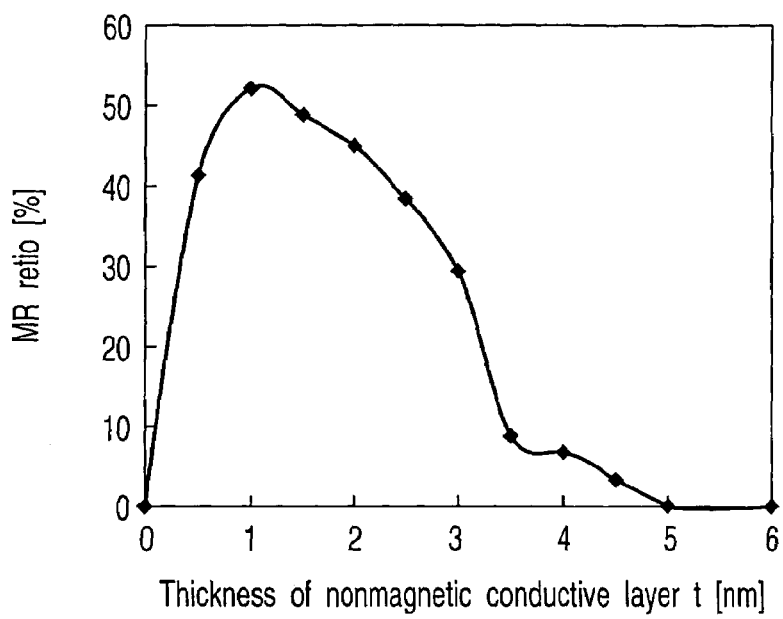
FIG. 5 is a graph illustrating the dependency of the MR ratio of the magnetoresistive element according to an embodiment of the invention upon the thickness t of the non-magnetic conductive layer of the element.

FIG. 5 illustrates the dependency of the MR ratio of the magnetoresistive element upon the thickness t of the non-magnetic conductive layer 3. The MR ratios shown in the figure were measured using magnetoresistive elements in which the non-magnetic conductive layer 3 is formed of Cu, and the width h of the layer 3 is set to 80 nm. As shown in FIG. 5, no effective MR ratio can be obtained if the thickness t-of the non-magnetic conductive layer 3 is more than 5 nm. From this, it is understood that the thickness t of the non-magnetic conductive layer 3 serving as a sensing area is an important parameter. It is preferable that the thickness t of the layer 3 be smaller than the mean free path for the layer 3.

Figure 6:
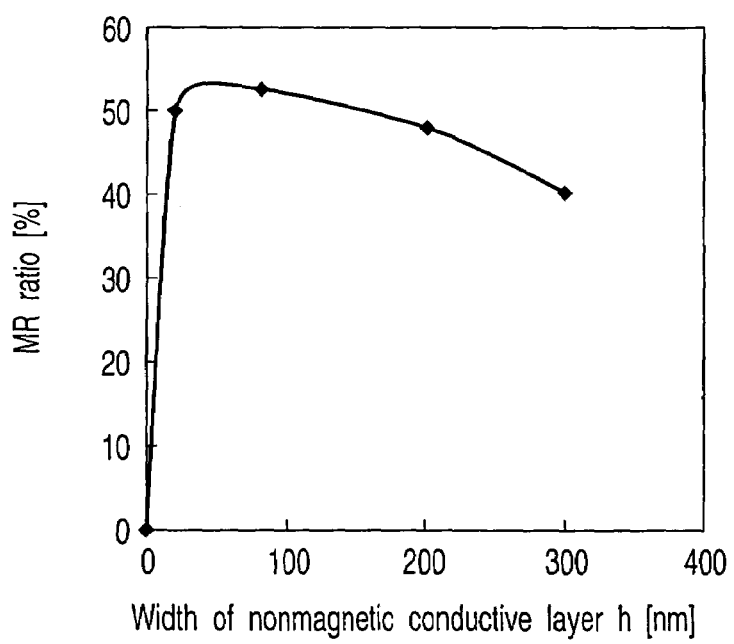
FIG. 6 is a graph illustrating the dependency of the MR ratio of the magnetoresistive element according to an embodiment of the invention upon the width h of the non-magnetic conductive layer of the element, the thickness t of the non-magnetic conductive layer being set to 1 nm.

FIG. 6 illustrates the dependency of the MR ratio upon the width h of the non-magnetic conductive layer 3, the thickness t of the layer 3 being set to 1 nm. It is understood from FIG. 6 that when the thickness t of the layer 3 is set to a value (in this case, 1 nm) that enables a sufficient magnetoresistance effect to be generated, a rather high magnetoresistance effect can be obtained even if the width h (element width) of the layer 3 is broadened up to about 300 nm.

Figure 7:
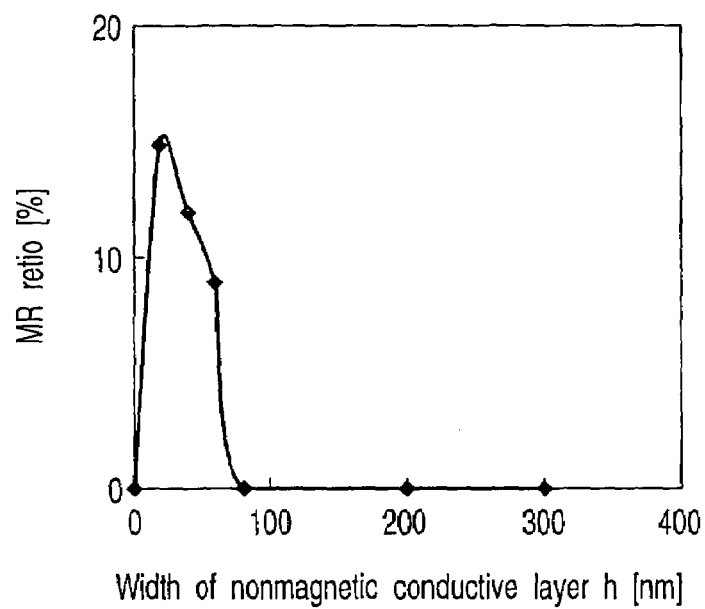
FIG. 7 is a graph illustrating the dependency of the MR ratio of the magnetoresistive element according to an embodiment of the invention upon the width h of the non-magnetic conductive layer of the element, the thickness t of the non-magnetic conductive layer being set to 5 nm.

FIG. 7 illustrates the dependency of the MR ratio upon the width h of the non-magnetic conductive layer 3, the thickness t of the layer 3 being set to 5 nm. It is understood from FIG. 7 that even if the thickness t of the non-magnetic conductive layer 3 is as thick as 5 nm, an effective MR ratio can be obtained by reducing the width h of the layer 3 less than 80 nm.

The materials used for the magnetoresistive element according to the embodiments of the present invention will be described.

The material for the non-magnetic conductive layer includes Cu, Au, Ag, Ru, Rh and Al.

The material for the first and second magnetic layers 11 and 12 includes Co, Fe or Ni, or an alloy containing at least one of these elements, such as CoFe alloy, FeCo alloy, CoNi alloy or NiFe alloy, typically, $Co_{90}Fe_{10}$. It is preferable that the first and second magnetic layers 11 and 12 have a thickness of about 2 to 20 nm. If the first and second magnetic layers 11 and 12 are too thin, their function as a source for spin-polarized electrons to be injected is degraded, and therefore the lower limit of the film thickness is about 2 nm.

Since those magnetic layers serve as a source for injecting spin-polarized electrons into the non-magnetic conductive layer, it is preferable that the polarization rate for up-electrons and down-electrons be high. Therefore, it is optimal to use a material, called a half metal, in which only up-electrons or down-electrons exist. The half metal includes $Fe_3O_4$, $Cr_2O_3$, a perovskite oxide such as LaSrMnO, and a Heusler alloy such as NiMnSb and CoMnGe.

Further, since spin injection is performed through the interfaces of the first and second magnetic layers 11 and 12 and the non-magnetic conductive layer 3, it is preferable that the materials of the layers 11, 12 and 3 be a combination that enables sharp interfaces to be easily formed. Specifically, it is preferable that the first and second magnetic layers 11 and 12 be immiscible with the non-magnetic conductive layer 3. For instance, if the magnetic layers contain Co as a main element, it is preferable that the non-magnetic conductive layer be formed of Cu, Au, etc. If the magnetic layers contain Ni as a main element, it is preferable that the non-magnetic conductive layer be formed of Ru, Ag, etc.

In order to pin the magnetization direction of the first and second magnetic layers 11 and 12, antiferromagnetic layers, for example, may be provided in contact with the magnetic layers, respectively. The antiferromagnetic layer includes Mn-based anti-ferromagnetic layer of PtMn, IrMn, etc. The thickness of the antiferromagnetic layers is set to about 10 to 20 nm.

Figure 8:
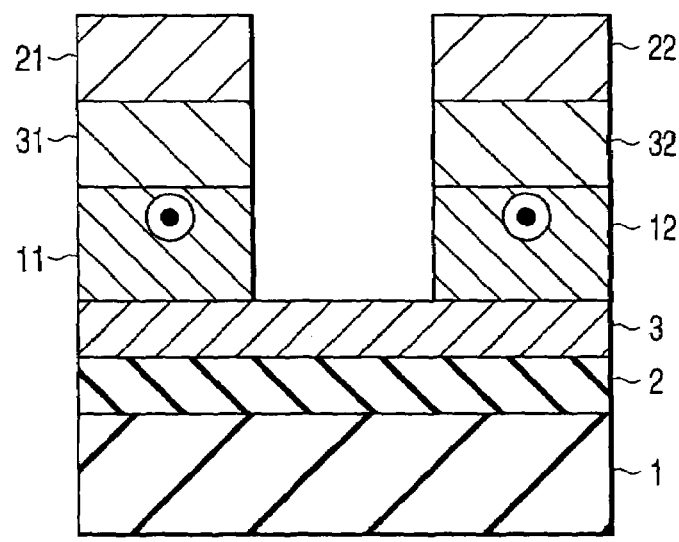
FIG. 8 is a sectional view of a magnetoresistive element according to another embodiment of the invention, taken along a plane parallel to the air-bearing surface of the magnetoresistive element.

In the magnetoresistive element shown in FIG. 8, antiferromagnetic layers 31 and 32 are interposed between the first and second magnetic layers 11 and 12 and the electrodes 21 and 22, respectively. Except for the antiferromagnetic layers, this element has the same structure as that shown in FIGS. 1 and 2.

Figure 9:
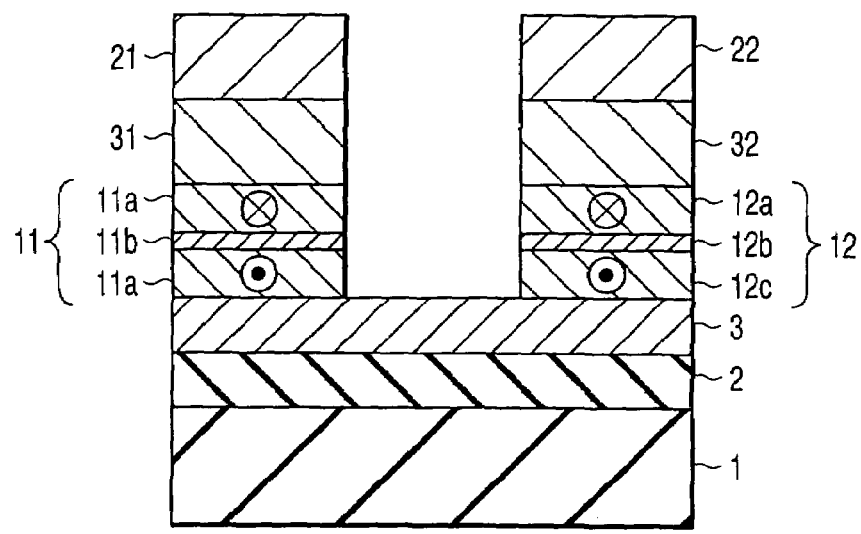
FIG. 9 is a sectional view of a magnetoresistive element according to yet another embodiment of the invention, taken along a plane parallel to the air-bearing surface of the magnetoresistive element.

The magnetization direction of the first and second magnetic layers 11 and 12 may be pinned by a so-called synthetic AF structure (magnetic layer/Ru layer/magnetic layer/antiferromagnetic layer) as shown in FIG. 9. In the magnetoresistive element shown in FIG. 9, the first magnetic layer 11 has a stacked structure of a magnetic layer 11a, Ru layer 11b and magnetic layer 11a. Similarly, the second magnetic layer 12 has a stacked structure of a magnetic layer 12a, Ru layer 12b and magnetic layer 12a. Further, antiferromagnetic layers 31 and 32 are interposed between the first and second magnetic layers 11 and 12 and electrodes 21 and 22, respectively. Except for these structures, the element of FIG. 9 has the same structure as that shown in FIGS. 1 and 2.

The first and second magnetic layers 11 and 12 may be formed of hard magnetic layers in order to pin the magnetization directions. In this case, the hard magnetic layers can be formed of a CoPt alloy, CoCr alloy, FePt alloy, etc.

The electrodes 21 and 22 can be formed of Cu, Au, Al, etc.

To form thin films used in the magnetoresistive element according to the embodiments of the present invention, various methods such as sputtering, MBE, ion-beam sputtering, and CVD can be utilized. These deposition methods can control the thickness of such a thin film as the non-magnetic conductive layer. Further, to define film dimensions other than the film thickness, patterning by lithography may be performed. Specifically, a stepper or electron-beam lithography equipment can be used to define, for example, the width h of the non-magnetic conductive layer, or the length of a sensing area corresponding to the track width.

Magnetoresistive elements according to another embodiments of the invention will now be described.

Figure 10:
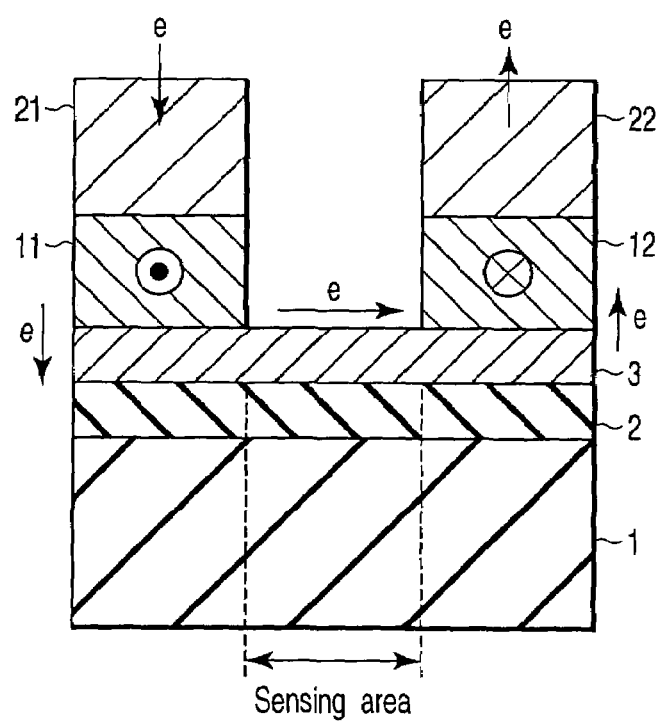
FIG. 10 is a sectional view of a magnetoresistive element according to a further embodiment of the invention, taken along a plane parallel to the air-bearing surface of the magnetoresistive element.

The magnetoresistive element shown in FIG. 10 differs from that of FIGS. 1 to 4 in that the magnetization direction of the magnetic layer 11 is opposite to that of the magnetic layer 12. In the element of FIG. 10, when an external (recording medium) magnetic field of a direction opposite to that of FIGS. 1 to 4 is applied thereto, a high resistance state and low resistance state are obtained, respectively.

Figure 11:
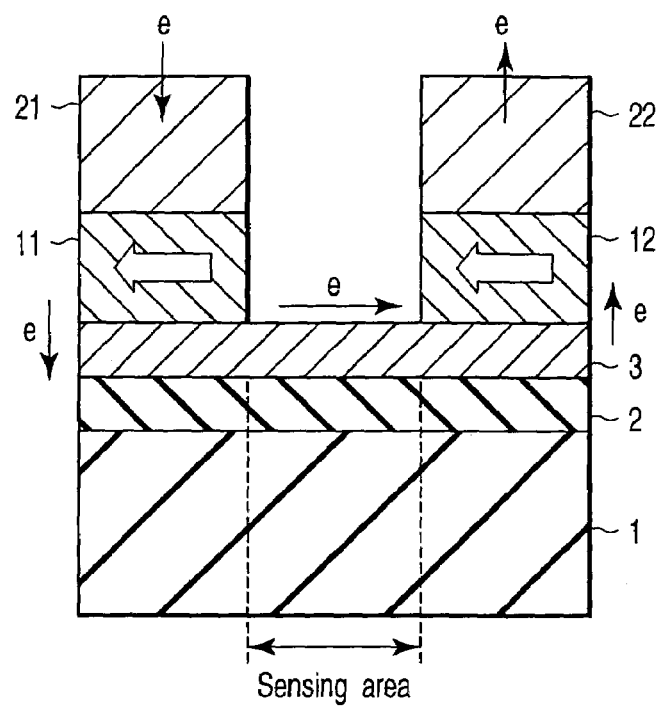
FIG. 11 is a sectional view of a magnetoresistive element according to a yet further embodiment of the invention, taken along a plane parallel to the air-bearing surface of the magnetoresistive element.
Figure 12:
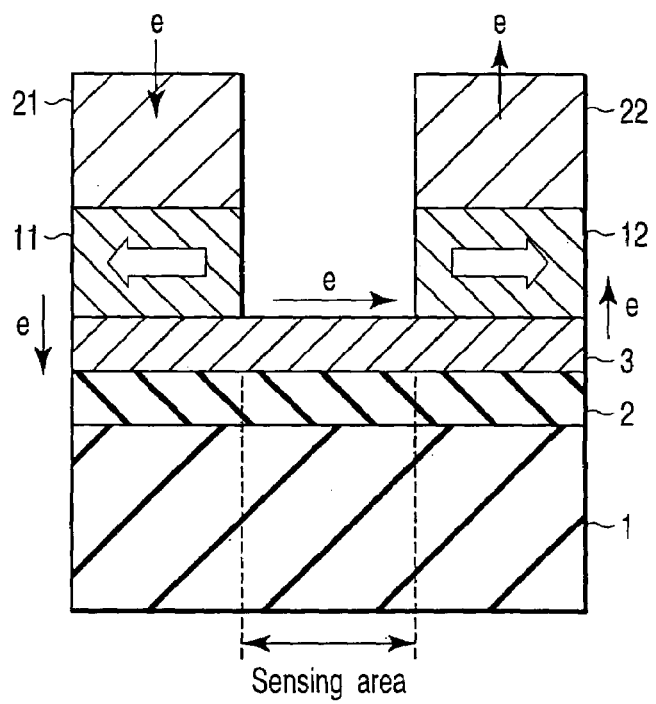
FIG. 12 is a sectional view of a magnetoresistive element according to another embodiment of the invention, taken along a plane parallel to the air-bearing surface of the magnetoresistive element.

It is not always necessary to pin the magnetization direction of the first and second magnetic layers 11 and 12 perpendicular to the ABS. For instance, in the magnetoresistive element shown in FIG. 11, the magnetizations of the first and second magnetic layers 11 and 12 are pinned parallel to the ABS and in the same direction. On the other hand, in the magnetoresistive element shown in FIG. 12, the magnetizations of the first and second magnetic layers 11 and 12 are pinned parallel to the ABS but in opposite directions. The magnetoresistive elements shown in FIGS. 11 and 12 operate on the same principle as mentioned above.

In a magnetoresistive element according to yet another embodiments of the invention, the order of stacking of thin films on the substrate may be opposite to that in the magnetoresistive element shown in FIGS. 1 to 4. That is, the electrodes may be provided close to the substrate, and the non-magnetic conductive layer may be provided remote from the substrate. This magnetoresistive element will be described with reference to FIGS. 13 to 15. FIG. 13 is a sectional view of the magnetoresistive element, taken along a plane parallel to the ABS of the magnetoresistive element. FIG. 14 is a view for explaining the positional relationship between the magnetoresistive element of FIG. 13 and a track on the magnetic disc. FIG. 15 is a sectional view illustrating the magnetoresistive element of FIG. 13 and a magnetic disc sectioned along a vertical plane.

In FIGS. 13 to 15, electrodes 21 and 22 are provided on the substrate 1 and separate from each other. An insulating layer 15 is arranged between the electrodes 21 and 22. First and second magnetic layers 11 and 12 are provided, separate from each other, on the electrodes 21 and 22, respectively. The insulating layer 15 is also arranged between the first and second magnetic layers 11 and 12. Insulating layers 16 are arranged on the side wall of the first magnetic layer 11 and that of the second magnetic layer 12, respectively. The magnetization direction of the first and second magnetic layers 11 and 12 is substantially pinned. A non-magnetic conductive layer 3 is provided on the first and second magnetic layers. The non-magnetic conductive layer 3 is a path for permitting spin-polarized electrons to flow from the first magnetic layer 11 to the second magnetic layer 12. The portion of the non-magnetic conductive layer 3 located between the first and second magnetic layers 11 and 12 is defined as a sensing area sensing an external magnetic field, and is positioned above a track (having a width TW) on the magnetic disc 101.

The magnetoresistive element, in which the electrodes are located close to the substrate, and the non-magnetic conductive layer is located remote from the substrate, can be configured as shown in FIGS. 16 and 17, such that the element is rotated by 90 degrees around an imaginary axis parallel to the surface of the magnetic disc 101 from the configuration shown in FIGS. 14 and 15. More specifically, in FIGS. 14 and 15, the stacking direction of the thin films on the substrate is parallel to the ABS, whereas in FIGS. 16 and 17, it is perpendicular to the ABS. In the latter case, however, the non-magnetic conductive layer 3 on the outer surface side can be made to oppose the magnetic disc 101.

A magnetic head and magnetic recording reproducing apparatus according to an embodiment of the invention will be described.

Figure 18:
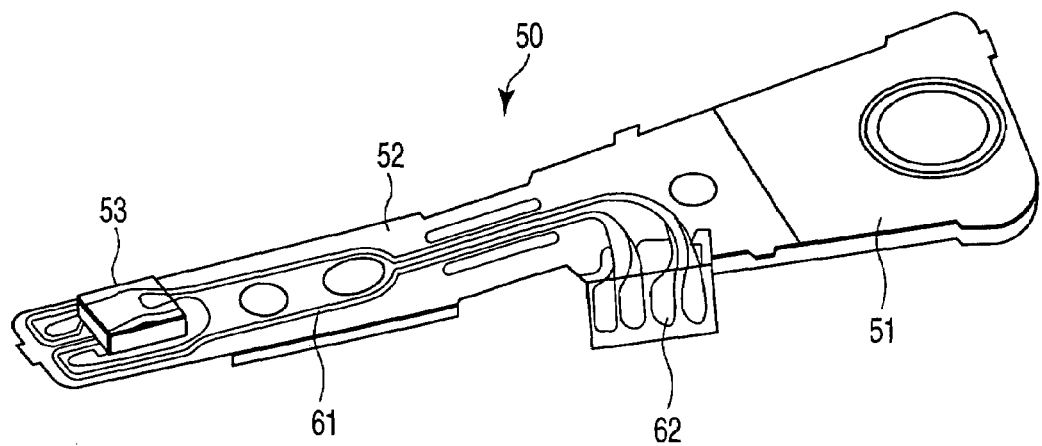
FIG. 18 is a perspective view illustrating a magnetic head assembly according to an embodiment of the invention.

FIG. 18 is a perspective view as viewed from a disc side, illustrating a magnetic head assembly, according to an embodiment of the invention, equipped with the above-described magnetoresistive element. The magnetic head assembly 50 has an actuator arm 51 with a bobbin section that holds a driving coil. A suspension 52 is coupled to the distal end of the actuator arm 51. A head slider 53 provided with a magnetoresistive element according to an embodiment of the invention is attached to the distal end of the suspension 52. Lead wires 61 for reading and writing data is provided on the suspension 52. The lead wires 61 are electrically connected to electrodes of the magnetic head mounted on the head slider 53. Further, the lead wires 61 are connected to the electrode pads 62 of the magnetic head assembly 50.

Figure 19:
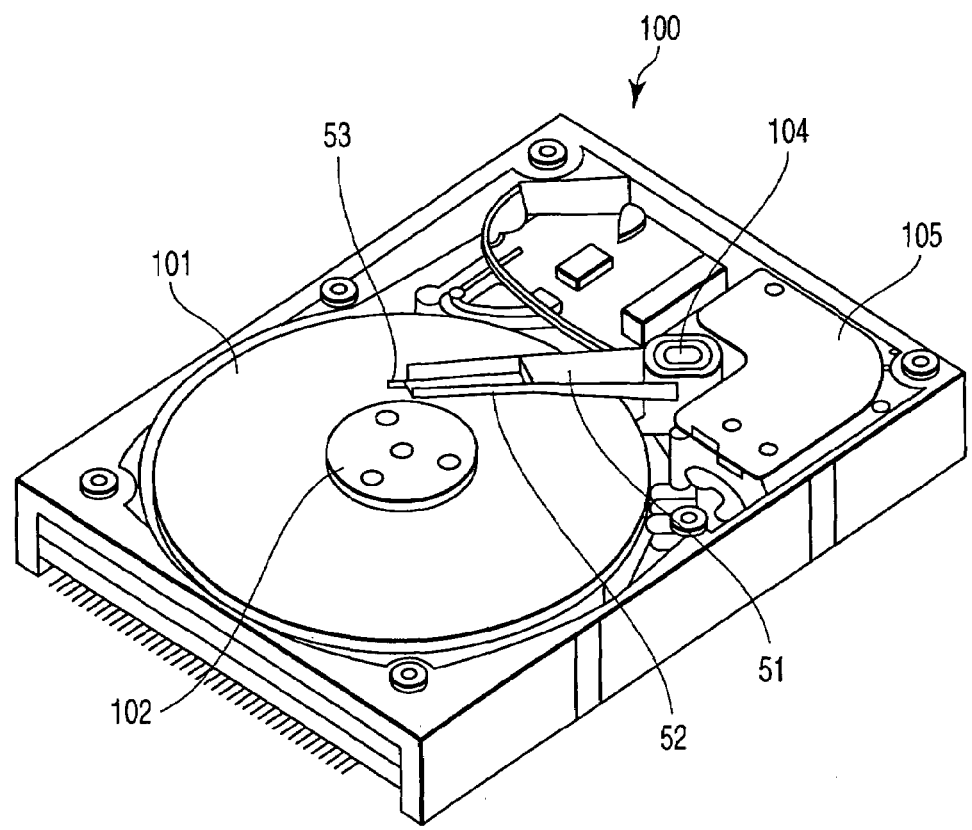
FIG. 19 is a perspective view of a magnetic recording/reproducing apparatus according to an embodiment of the invention.

FIG. 19 is a perspective view of a magnetic recording/reproducing apparatus 100 according to an embodiment of the invention. The magnetic recording/reproducing apparatus 100 uses a rotary actuary. A magnetic disc 101 is mounted on a spindle 102, and is rotated by a motor (not shown) responsive to control signals output from a drive controller (not shown). A plurality of magnetic discs 101 may be incorporated in the apparatus 100. The actuator arm 51 of the magnetic head assembly 50 shown in FIG. 18 is rotatably supported by ball bearings (not shown) provided on an upper portion and lower portion of a pivot 104 located near the magnetic disc 101. As shown in FIG. 18, the suspension 52 is connected to the distal end of the actuator arm 51, and the head slider 53 is attached to the distal end of the suspension 52. A voice coil motor 105, a type of a linear motor, is provided to the proximal end of the actuator arm 51. The voice coil motor 105 comprises a driving coil (not shown) wound by the bobbin section of the actuator arm 51, and a magnetic circuit formed of a permanent magnet and yoke that oppose each other with the coil interposed therebetween. The voice coil motor 105 is used to rotate the actuator arm 51. When the magnetic disc 101 is rotated, the ABS of the slider 53 floats above the surface of the magnetic disc 101 by a predetermined amount, thereby recording and reproducing data on and from the magnetic disc 101.

The above-described magnetic head and magnetic recording/reproducing apparatus can perform recording and reproduction of a high density of 500 Gbit/inch$^2$ or more.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A magnetoresistive element comprising:

a first magnetic layer and a second magnetic layer separate from each other, the first magnetic layer and the second magnetic layer each having a magnetization whose direction is pinned; and a non-magnetic conductive layer electrically connecting the first and second magnetic layers, the first magnetic layer and the second magnetic layer contact with a same surface of the non-magnetic conductive layer, the non-magnetic conductive layer forming a path of spin-polarized electrons from the first magnetic layer to the second magnetic layer, and the non-magnetic conductive layer comprising a portion located between the first magnetic layer and the second magnetic layer, the portion being a sensing area, wherein the non-magnetic conductive layer is formed on an insulating layer so as to be in contact with the first magnetic layer and the second magnetic layer, the sensing area of the non-magnetic conductive layer located between the first magnetic layer and the second magnetic layer has a length of 100 nm or less, and the magnetoresistive element has no magnetic layer in contact with the sensing area of the non-magnetic conductive layer.

2. The magnetoresistive element according to claim 1, wherein the non-magnetic conductive layer has a thickness of 0.5 nm to 5 nm.

3. The magnetoresistive element according to claim 1, wherein the non-magnetic conductive layer has a width of 100 nm or less, the width being perpendicular to the length of the sensing area of the non-magnetic conductive layer.

4. The magnetoresistive element according to claim 1, wherein the non-magnetic conductive layer contains at least one element selected from the group consisting of Cu, Au, Ag, Ru, Al and Rh.

5. The magnetoresistive element according to claim 1, wherein the first magnetic layer and the second magnetic layer contain at least one element selected from the group consisting of Co, Fe and Ni.

6. The magnetoresistive element according to claim 1, further comprising antiferromagnetic layers provided in contact with the first magnetic layer and the second magnetic layer, respectively.

7. The magnetoresistive element according to claim 1, wherein the first magnetic layer and the second magnetic layer are formed of a hard magnetic layer containing Co or Fe.

8. The magnetoresistive element according to claim 1, wherein the first magnetic layer and the second magnetic layer are disposed on the same surface of the non-magnetic conductive layer with a distance which defines a track width of the magnetoresistive element.

9. A magnetic head comprising a magnetoresistive element comprising:

a first magnetic layer and a second magnetic layer separate from each other, the first magnetic layer and the second magnetic layer each having a magnetization whose direction is pinned; and a non-magnetic conductive layer electrically connecting the first and second magnetic layers, the first magnetic layer and the second magnetic layer contact with a same surface of the non-magnetic conductive layer, the non-magnetic conductive layer forming a path of spin-polarized electrons from the first magnetic layer to the second magnetic layer, and the non-magnetic conductive layer comprising a portion located between the first magnetic layer and the second magnetic layer, the portion being a sensing area, wherein the non-magnetic conductive layer is formed on an insulating layer so as to be in contact with the first magnetic layer and the second magnetic layer, and the sensing area of the non-magnetic conductive layer located between the first magnetic layer and the second magnetic layer has a length of 100 nm or less, and the magnetoresistive element has no magnetic layer in contact with the sensing area of the non-magnetic conductive layer.

10. A magnetic reproducing apparatus comprising:

a magnetic recording medium; and a magnetic head comprising a magnetoresistive element comprising: a first magnetic layer and a second magnetic layer separate from each other, the first magnetic layer and the second magnetic layer each having a magnetization whose direction is pinned; and a non-magnetic conductive layer electrically connecting the first and second magnetic layers, the first magnetic layer and the second magnetic layer contact with a same surface of the non-magnetic conductive layer, the non-magnetic conductive layer forming a path of spin-polarized electrons from the first magnetic layer to the second magnetic layer, and the non-magnetic conductive layer comprising a portion located between the first magnetic layer and the second magnetic layer, the portion being a sensing area, wherein the non-magnetic conductive layer is formed on an insulating layer so as to be in contact with the first magnetic layer and the second magnetic layer, and the sensing area of the non-magnetic conductive layer located between the first magnetic layer and the second magnetic layer has a length of 100 nm or less, and the magnetoresistive element has no magnetic layer in contact with the sensing area of the non-magnetic conductive layer.

11. The magnetic reproducing apparatus of claim 10, wherein the portion of the non-magnetic conductive layer is arranged to be disposed over a recording track of the magnetic recording medium.

* * * * *